3,443,013
METHOD OF CONTROLLING PESTS WITH MERCURY COMPOUNDS

Saul R. Buc, deceased, late of Easton, Pa., by Dolores M. Buc, administratrix, Easton, Pa., and Fred E. Woodward, Watchung, Plainfield, N.J., assignors to GAF Corporation, a corporation of Delaware
No Drawing. Filed Feb. 24, 1964, Ser. No. 347,336
Int. Cl. A01n 9/38
U.S. Cl. 424—245                         27 Claims

ABSTRACT OF THE DISCLOSURE

A method of controlling pests such as insects, bacteria and fungicide, and a composition therefor containing an effective amount of organo-mercury compound. Such compounds are characterized by the presence of one or more nitrogen atoms within the molecule.

---

The present invention relates to the control of various pests including insects, bacteria and fungi, and more particularly it relates to a method for controlling such pests with a certain class of organo-mercury compounds or complexes.

Mercury compounds have long been used for medicinal and germicidal purposes. Various organic and inorganic mercurial compounds have been disclosed as bactericides and fungicides. Calomel ($Hg_2Cl_2$) itself has been suggested and used as an insecticide for many years. Due to high toxicity to humans and inability to meet official tolerance and residue standards, however, mercury compounds heretofore utilized as pesticides have met with uncertain acceptance and ordinarily have a limited spectrum of activity.

Serious drawbacks of mercury compounds previously employed as pesticides also have been their inability to kill gram-negative bacteria and their corrosiveness to human skin. While the irritability of these compounds can be minimized, at least in solution, this effect is accomplished only at the expense of water solubility and the products are still likely to be corrosive to the skin at the concentrations employed in commercial formulations.

In connection with their use as insecticides, the mercury compounds heretofore utilized usually also have disadvantages arising from their insolubility and/or inability to affect insect egg-laying levels, the viability of eggs which are laid, and/or completely satisfactory degrees of insect kill.

It is, therefore, a primary object of the invention to provide a method for effectively controlling pests, such as insects, bacteria and fungi by contacting same with the hereinafter defined organo-mercury substances.

It is another object of the present invention to provide a method for effectively controlling pests, such as insects, bacteria and fungi wherein the pests are contacted with organo-mercury substances which advantageously are characterized by a relatively high degree of water-solubility.

A particular object of the present invention is to provide a method for controlling the lay of viable insect eggs by subjecting the insects to a treatment with the hereinafter defined organo-mercury substances whereby the insects are caused to feed on a pesticidal composition comprising the organo-mercury substances and an inert carrier and a feed or attractant for the insects.

A further particular object of the present invention is to provide a method for an effective control of gram-negative bacteria wherein the bacteria are contacted with the hereinafter defined organo-mercury substances.

Additional objects of the present invention will be apparent from the following description thereof.

Broadly described, the present invention provides a method for controlling pests which comprises contacting said pests with organo-mercury substances selected from the group consisting of (a) The organo-mercuric compounds of the formulas

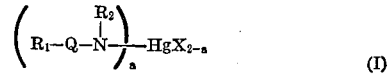   (I)

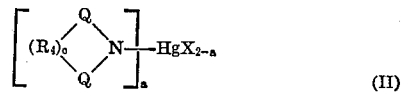   (II)

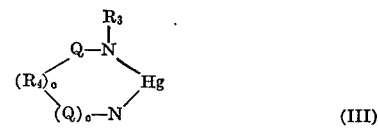   (III)

and (b) the organo-mercuric complexes of the formulas

   (IV)

and

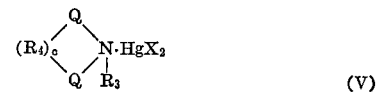   (V)

wherein Q is selected from the group consisting of

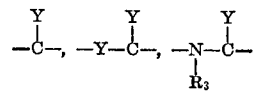

and —$SO_2$—, wherein Y represents oxygen and sulfur; $a$ is an integer selected from the group consisting of 1 and 2; $c$ is an integer selected from the group consisting of 0 and 1; each $R_1$ and $R_2$ is selected from the group consisting of hydrogen, alkyl having from 1 to about 8 carbon atoms (i.e., methyl, ethyl, propyl, isopropyl, n-butyl, n-hexyl, n-octyl, etc.), alkenyl having from 1 to about 8 carbon atoms (i.e., ethenyl, 2-butenyl, 3-hexenyl, 4-octenyl, etc.), cycloalkyl having from 3 to about 8 carbon atoms (i.e., cyclopropyl, cyclobutyl, cyclopentyl, cyclohexyl, cyclooctyl, etc.), cycloalkenyl having from 3 to about 8 carbon atoms (i.e., cyclopropenyl, cyclobutenyl, cyclohexenyl, etc.), aryl having no more than 2 benzene nuclei (i.e., phenyl, biphenyl, naphthyl, etc.), aralkyl wherein aryl substituent contains no more than 2 benzene nuclei and said alkyl substituent is lower alkyl (i.e., benzyl, phenylethyl, phenylbutyl, naphthylmethyl, etc.); and wherein $R_1$ and $R_2$ taken together with the atoms to which they are attached form a heterocyclic ring wherein the —$R_1$—$R_2$— portion is selected from the group consisting of alkylene having from 1 to about 5 carbon atoms (i.e., methylene, ethylene, trimethylene, tetramethylene, pentamethylene, etc.), an acyclic hydrocarbon radical having from 2 to about 5 carbon atoms and containing ethylenic unsaturated bonds, arylene having no more than 2 benzene nuclei (i.e., phenylene, naphthylene, etc.), arylenealkylene wherein the arylene radical has no more than 2 benzene nuclei and the alkylene radical has from 1 to about 5 carbon atoms (i.e., phenylenemethylene, phenyleneethylene, naphthylenemethylene, etc.), substituted derivatives of said alkylene and acyclic hydrocarbon radicals containing a heteroatom, said heteroatom being selected from the group consisting of oxygen, sulfur, and nitrogen, and said heteroatom being in the nucleus of said heterocyclic ring (i.e., heterocyclic rings of morpholinone, piperazinone, thiomorpholinone, pyrazolone, pyridazone, thiotetrazoline, thiobiazolone, thiooxybiazoline, etc.), substituted derivatives of said alkyl, alkenyl, cycloalkyl, cycloalkenyl, aryl, aralkyl and —$R_1$—$R_2$— portion of said heterocyclic ring wherein said substituted substituents are selected from the group consisting of halo (i.e., chloro, bromo, fluoro, and iodo), nitro, mercapto, amino, sulfo, lower alkyl (i.e., methyl, ethyl, butyl, etc.), lower alkoxy (i.e., methoxy, ethoxy, butoxy, etc.), lower alkylthio (i.e., methylthio, ethylthio, etc.), carbamyl, ureido, and sulfamyl; $R_3$ is selected from the group consisting of hydrogen, alkyl having from 1 to about 6 carbon atoms (i.e., methyl, ethyl, propyl, isopropyl, n-butyl, n-hexyl, etc.), cycloalkyl having from 3 to about 8 carbon atoms (i.e., cyclopropyl, cyclobutyl, cyclopentyl, cyclohexyl, etc.), and aryl having no more than 2 benzene nuclei (i.e., phenyl, biphenyl, naphthyl, etc.); $R_4$ is selected from the group consisting of alkylene having from 1 to about 5 carbon atoms (i.e., methylene, ethylene, trimethylene, tetramethylene, pentamethylene, etc.), an acyclic hydrocarbon radical having from 2 to about 5 carbon atoms and containing ethylenic unsaturated bonds, arylene having no more than 2 benzene nuclei (i.e., phenylene, naphthylene, etc.), arylenealkylene wherein said arylene radical has no more than 2 benzene nuclei and said alkylene radical has from 1 to about 5 carbon atoms (i.e., phenylenemethylene, phenyleneethylene, phenylenetrimethylene, naphthylenemethylene, etc.), and substituted derivatives of said alkylene and acyclic hydrocarbon radicals containing a heteroradical selected from the group consisting of

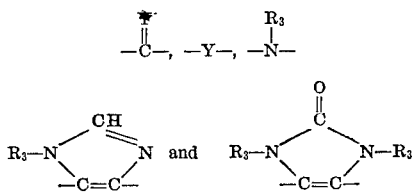

said heteroradical being in the nucleus of the heterocyclic ring formed by $R_4$ and the bivalent radical to which it is attached (i.e., the heterocyclic rings of propanol, hydantoin, thiohydantoin, uracil, thiourazole, thiouramil, xanthine, uric acid, 3,7-dimethyl uric acid, theobromine, theophyline, etc.), and substituted derivatives of said alkylene, acyclic hydrocarbon radical, arylene, arylenealkylene, and nuclear substituted acyclic hydrocarbon radicals wherein said substituted substituents are selected from the group consisting of halo (i.e., chloro, bromo, fluoro, and iodo), nitro, mercapto, amino, sulfo, lower alkyl (i.e., methyl, ethyl, butyl, etc.), lower alkoxy (i.e., methoxy, ethoxy, butoxy, etc.), lower alkylthio (i.e., methylthio, ethylthio, etc.), carbamyl, ureido, and sulfamyl; wherein each of $R_5$ and $R_6$ is selected from the group consisting of $R_1$ and $R_2$ when $c$ is 0 and 1, and wherein when $c$ is 0, $R_5$ and $R_6$ taken together form bivalent radical $R_4$; and X is an anion.

The anion X present in some embodiments of the organomercuric substances used in the present method suitably may be any inorganic or organic anion of an acid capable of forming a salt with bivalent mercury. For solubility purposes, generally it is preferred that the anion, when organic in nature, contains no more than about 20 carbon atoms.

Specific examples of suitable anions include, without limitation, chloride, bromide, fluoride, iodide, hydroxide, sulfate, nitrate, acetate, hydroxyacetate, propionate, butyrate, isobutyrate, laurate, oleate, stearate, succinate, maleate, benzoate, methyl sulfate, furoate, phthalate, phosphate, thiocyanate, citrate, benzene sulfonate, etc.

Specific examples of organo-mercuric substances contemplated for use in the present method include, without limitation, mercuric formamide, mercuric acetamide, mercuric propionamide, mercuric butyramide, mercuric α-fluoroacetamide, mercuric α-chloroacetamide, mercuric α-ethoxyacetamide, mercuric α-butoxyacetamide, mercuric glycolamide, mercuric γ-hydroxybutyramide, mercuric β-nitropropionamide, mercuric γ-aminobutyramide, mercuric thioglycolamide, mercuric sulfocaproamide, mercuric hexahydrobenzamide, mercuric 3-chlorocylobutanoamide, mercuric 3-methoxy-cyclobutanoamide, mercuric 1-carbamyl-1-cyclohexene, mercuric β-chlorovinylacetamide, mercuric benzamide, mercuric p-chlorobenzamide, mercuric p-nitrobenzamide, mercuric o-sulfobenzamide, mercuric 2-bromo-2-methoxy-benzamide, mercuric 2,3-dichlorophenoxyacetamide, mercuric phenylacetamide, mercuric 1-carbamylnaphthalene, mercuric 2-pyrrolidone, mercuric N-methyl-2-pyrrolidone, mercuric caprolactam, mercuric 2-piperidinone, mercuric morpholinone, mercuric thiomorpholinone, mercuric phthalimide, mercuric piperazinone, mercuric pyrazolone, mercuric pyridazone, mercuric thiotetrazoline, mercuric thiobiazolone, mercuric thiooxybiazaline, mercuric oxamide, mercuric benzimidazole, mercuric urea, mercuric methylurea, mercuric N,N'-diethylurea, mercuric phenylurea, mercuric N,N-dimethyl-N'-phenylurea, mercuric biuret, mercuric ethoxyphenylurea, mercuric thiourea, mercuric N,N'-diphenylthiourea, mercuric allylthiourea, mercuric butyryl urea, mercuric succinimide, mercuric maleimide, mercuric oximide, mercuric naphthalimide, mercuric glutarimide, mercuric tartramide, mercuric fumaramide, mercuric barbituric acid, mercuric diethyl barbituric acid, mercuric theobromine, mercuric o-sulfobenzoic imide, mercuric xanthine, mercuric theophyline, mercuric hydantoin, mercuric thiohydantoin, mercuric 5-ureido-hydantoin, mercuric uracil, mercuric naphthsultam, mercuric chloride pyrrolidone, mercuric chloride N-methyl pyrrolidone, mercuric bromide acetamide, mercuric acetate butyramide, mercuric iodide benzamide, mercuric hydroxide N-methyl-acetamide, mercuric sulfate phthalamide, mercuric nitrate succinimide, mercuric hydroxyacetate maleimide, mercuric propionate caprolactam, mercuric butyrate phenylacetamide, mercuric laurate oxamide, mercuric oleate tartramide, mercuric succinate glutarimide, mercuric maleate phthalamide, mercuric benzoate urea, mercuric methyl sulfate phenylurea, mercuric furoate naphthalimide, mercuric phthalate barbituric acid, mercuric phosphate xanthine, mercuric thiocyanate hydantoin, mercuric citrate uracil, mercuric benzene sulfonate naphthsultam, N-chloromercuric-pyrrolidone, N-acetoxymercuric-acetamide, N-bromomercuric-N-methyl-acetamide, N-iodomercuric-benzamide, N-hydroxymercuric-N-phenyl-acetamide, and the like.

Preferred for utilization in the present method, particularly for controlling the housefly, the cockroach, the Mexican bean beetle, similar insect pests and gram-negative bacteria are the mercuric compounds and complexes of Formulas I and IV derived from carboxylic amides.

Particularly preferred are the corresponding organomercuric compounds and complexes prepared from lactams of the formula

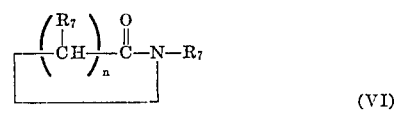

(VI)

wherein $n$ is an integer selected from the group consisting of 3, 4, and 5, and $R_7$ selected from the group consisting of hydrogen and lower alkyl (i.e., methyl, ethyl, propyl, isopropyl, butyl, etc.). Specific examples of such lactams include 2 - pyrrolidone, n - methyl - 2 - pyrrolidone, N - ethyl - 2 - pyrrolidone, 5 - methyl - 2-pyrrolidone, 5-ethyl-2-pyrrolidone, N-methyl-5-ethyl-2-pyrrolidone, 3,3-dimethyl-2-pyrrolidone, 4-methyl-2-pyrrolidone. 4-butyl-2-pyrrolidone. N-butyl-4-ethyl-2-pyrrolidone, caprolactam N-methylcaprolactam, 5-methyl-caprolactam, 3,3-dimethylcaprolactam, N-methyl-3-diethyl-caprolactam, 2-piperidone, N-methyl-2-piperidone, 5-methyl-2-piperidone, 3,3-diethyl-2-piperidone, N-methyl-4-methyl-2-piperidone and the like.

The corresponding organo-mercuric compounds and complexes prepared from such lactams are stable at ambient conditions, water-soluble, and relatively easy to handle. Such organo-mercuric substances decompose at temperatures above about 200° C. but do not sublime. The non-subliming properties of these substances are most significant since mercurides heretofore used as pesticides with high water solubility, such as the ethyl mercurides, exhibit subliming tendencies, in many cases even at ambient temperatures, which further aggravates the problem attendant the handling of such compounds having relatively high toxicity.

The organo-mercuric substances employed in the present method suitably may be utilized alone but preferably are used in compositions containing a carrier. Carriers which suitably may be employed in the present method may consist of any inert material or combination of inert materials, including liquids and solids, conventionally employed in preparing pesticidal compositions. Thus, suitable pesticidal compositions for use in the present method may be prepared by dissolving and/or dispersing the organo-mercuric substance or mixtures thereof in a normally liquid carrier, including, without limitation, water, liquid ketones, such as acetone, methyl ethyl ketone, and cyclohexanone, selected liquid iso-paraffinic hydrocarbons, such as those known commercially as Soltrols and Velsicols, liquid straight-chain hydrocarbons, naphthas, kerosenes, such as deodorized kerosene, and the like. Specific examples of solid carriers contemplated for use in the method of the invention include, inter alia, silicas, alumina, pumice, talc, mica, diatomaceous earth, clays, such as Barden clay, bentonite, attapulgite, and the like. The present invention also contemplates the use of greases and waxes as carriers. In embodiments of the invention wherein the organo-mercuric substances are employed as insecticides, the carrier for the toxic substance also may be partially or totally in the form of an insect food and/or attractant formulation.

The actual amount of the organo-mercuric substance present in a pesticidal composition employed in the present invention depends, inter alia, upon the nature of the particular organo-mercuric substance and carrier material, the nature of the pests to be treated, the nature and environmental conditions of the pesticide-infested area to be treated, and the technique contemplated for use in applying the pesticidal composition to the pest-infested area.

The following are preferred pesticidal compositions for use in the present method in the indicated embodiments thereof:

Insect baits.—The use of the organo-mercuric substances at concentrations of from about 0.01% to about 0.2% by weight in insect milk or plant-based foods for eradicating houseflies, beetles, cockroaches, etc., or rendering same incapable of laying viable eggs.

Cutting fluids and oil emulsions.—The various pseudomonas species (gram-negative) are very difficult to kill according to Bennett & Wheeler, "Survival of Bacteria in Cutting Oil," Applied Microbiology, 2, 268 (1954).

The water-soluble nature of the organo-mercuric substances, particularly mercuric pyrrolidone, allows them to be readily incorporated into emulsions and solutions of surfactants used; for example, to cool and lubricate various metal working operations at concentrations of from about 0.0005% to about 0.01% by weight either alone or in combination with other types of biocides, such as trimethylol nitromethane, chlorinated phenols, thio-bis-phenols, thiocarbanilides, bis-ureas, dialkyl dithiocarbamates and the like, to control the various gram-negative pseudomonas species of bacteria.

Paper making operations.—The use of low concentrations of the organo-mercuric substances, from about 0.0001% to about 0.001% by weight, in water during the making of paper to prevent the formation of "slime."

Seed treatment.—The use of the organo-mercuric substances as a dust (solution or solid form of mercuric pyrrolidone adsorbed on or mixed with inert clays, diatomaceous earth or the like at about 0.001% to about 5% and higher by weight) or as a solution to treat seeds to protect the seeds from attack by vegetable parasites. Such seed treating dusts suitably may contain other fungicides such as the various nitrophenols, Captan, etc.

Water-flooding operations.—The use of dilute solutions, from about 0.0001% to about 0.01% by weight, of the organo-mercuric substances in the water used for injection into oil fields (to maintain pressure and rate of flow) in order to control bacterial growth.

Protection of liquid formulations.—Many industrial and household products containing water support the growth of bacteria or fungi. These include water-based latices or alkyd emulsions for paint, latices of all types sold industrially, latex-wax emulsions for floor polishes, cosmetic emulsions and solutions, adhesive formulations containing starch, dextrin and other natural gums or synthetic latices or water-soluble polymers. The organo-mercuric substances can be used in such formulations in amounts of from about 0.001% to about 1% by weight.

Sanitizing and disinfecting of hard surfaces.—The organo-mercuric substances may be used in combination with soap or surfactants and other biocides such as orthophenyl-phenol at concentrations of from about 0.01% to about 2% by weight in aqueous preparations for cleaning and/or sanitizing hospital floors and walls, etc.

The method of the present invention having been broadly described, the following examples are given to show specific embodiments thereof. It will be understood that the examples are given only for illustration purposes and not by way of limitation.

EXAMPLE 1

In a test designed to determine the toxicity of the organo-mercuric substances employed in the present method, five groups of ten albino rats of the Sherman Wistar strain were set aside and observed for a period of one week to assure normalcy. The animals were starved for a period of 24 hours prior to dosing. Each animal was weighed and the individual dosage was calculated. The following dosage levels of a 10% mercuric-2-pyrrolidone w.v. solution were employed:

| Ml./kg.: | Rats |
|---|---|
| 0.50 | 10 |
| 0.71 | 10 |
| 1.00 | 10 |
| 1.41 | 10 |
| 2.00 | 10 |

The calculated dosage was administered directly into the stomach of the rat by means of a syringe and stomach tube. The rats were observed daily for a 14-day period and mortalities were noted. The results of the tests are reported in Table 1 below.

TABLE 1

| Dosage level ml./kg. | No. rats dosed | Total dead after 14 days | Survived |
|---|---|---|---|
| 0.50 | 10 | 0 | 10 |
| 0.71 | 10 | 4 | 6 |
| 1.00 | 10 | 9 | 1 |
| 1.41 | 10 | 10 | 0 |
| 2.00 | 10 | 10 | 0 |

Evaluated according to the Thompson Moving-Average Method as described by Carrol S. Well in "Tables for Convenient Calculation of Median–Effective Dose ($LD_{50}$ or $ED_{50}$) and Instructions in Their Use," Biometrics, 8, No. 3, pp. 249–263, September 1952, the results of the tests were as follows:

LD$_{50}$ and 19/20 confidence limits 73 (0.62–0.87) ml./kg.
73 (62–87) ml./kg.

Thus, it can be seen that mercuric 2-pyrrolidone is about one-half as toxic as mercuric chloride, ethylmercuric phosphate, and phenylmercuric triethanol ammonium lactate (all LD$_{50}$ 30–37 mg./kg.).

EXAMPLE 2

Mercuric 2-pyrrolidone was obtained as the hydrate, Hg(C$_4$H$_6$NO)$_2$·H$_2$O, by the method of Tafel and Stern, Ber. 33, 2226 (1900). By this method, 108.5 grams of mercuric oxide, 85 grams of pyrrolidone, and 250 cc. of water were heated to boiling and stirred for 15 minutes. The resulting mixture was then filtered to remove unreacted mercuric oxide, and the filtrate was chilled whereupon dense white crystalline solid separated out from the liquor. The solid was then collected and dried. It weighed 88 grams, and proved by analysis to be mercuric pyrrolidone monohydrate, Hg(C$_4$H$_6$NO)$_2$·H$_2$O.

A milk fly bait containing 20% sucrose was then prepared from dehydrated milk powder. To this bait was added a sufficient amount of a dilute solution of the mercuric pyrrolidone monohydrate to bring the concentration to 312 p.p.m. The treated bait was then fed to houseflies. The flies so treated apparently were unharmed and laid eggs heavily. However, none of the eggs laid by the treated flies hatched when stored at normal hatching conditions.

The tests were repeated for bait loadings of 625 p.p.m. and 1250 p.p.m. The baits provided a 54% kill and 84% kill, respectively, of flies treated therewith. In both cases, treated flies which lived laid very few eggs, none of which hatched.

EXAMPLE 3

One part of 2-pyrrolidone was added to four parts of mercuric chloride in aqueous solution. The excess water was evaporated to yield a brown residue which was purified by recrystallization from water. Flies were fed on a bait prepared as in Example 2 from the solid product thereby obtained with a 300 p.p.m. level being utilized. The treated flies laid no viable eggs.

At 500 p.p.m. the product provided a 27% kill of flies treated with the bait. The flies which lived failed to lay any viable eggs.

EXAMPLE 4

One part of N-methyl-2-pyrrolidone and four parts of mercuric chloride were combined as in Example 3, and the solid product obtained was made up into a bait at a 500 p.p.m. level as in Example 2. The bait was observed to provide a 29% kill of flies which fed thereon. The treated flies which were apparently unharmed laid eggs but none hatched.

EXAMPLE 5

21.7 grams of mercuric oxide were added to a solution of 25.8 grams of 3-methyl-2-pyrrolidone in 300 cc. of water and the mixture was stirred and heated at the boiling point for about 15 minutes. The resulting mixture was then filtered while hot to remove unreacted mercuric oxide, and the filtrate was cooled whereupon a white solid precipitated therefrom. The solid product was dried in a vacuum desiccator, and 8.0 grams of white mercuric 3-methyl-2-pyrrolidone hydrate were obtained. It was slightly soluble in water and melted at 168–170° C. with decomposition.

A milk bait containing 300 p.p.m. of this product was made up and houseflies treated therewith as in Example 2. Flies treated with the bait were apparently unharmed, but laid no viable eggs.

EXAMPLE 6

21.6 grams of mercuric oxide were reacted with 19.8 grams of succinimide in accordance with the procedure of Example 2, and 22.0 grams of white solid were obtained. A milk test food was made up as in Example 2 at 300 p.p.m. of the mercuric succinimide product. Flies fed the treated food were caused to lay fewer eggs than untreated control flies, and all of the eggs laid by the treated flies failed to hatch.

EXAMPLE 7

Solid mercuric acetate was added to an ethanolic solution of mercuric 2-pyrrolidone. By heating and stirring the reaction was completed, giving a clear solution. The solution was chilled and a white precipitate of N-acetoxy-mercuri-2-pyrrolidone was obtained. A milk bait containing 300 p.p.m. of this compound was made as in Example 2. Flies fed on this bait laid no viable eggs.

EXAMPLE 8

N-chloromercuri-2-pyrrolidone was prepared by dissolving mercuric pyrrolidone in ethanol and adding a solution of mercuric chloride in tetrahydrofuran. A white precipitate was obtained which was collected and dried. This product was made up in a milk bait at 300 p.p.m. as in Example 2. Flies fed on this bait laid few eggs, and none hatched.

EXAMPLE 9

A mixture of 21.7 grams of mercuric oxide and 36 grams of benzamide in 350 cc. of water reacted as in Example 2 provided 16 grams of mercuric benzamide which was tested on flies in accordance with the procedure of Example 2 at loadings of 300 p.p.m. Flies treated laid eggs, but none of the eggs hatched.

EXAMPLE 10

From 17.4 grams of acetamide and 21.7 grams of mercuric oxide in 50 cc. of water, 13.1 grams of white mercuric acetamide were obtained by the process of Example 2. The product was tested on flies as in Example 2 at a 300 p.p.m. level. The treated flies were observed to lay eggs, but none of the eggs were viable.

EXAMPLE 11

By the process of Example 2, 30.6 grams of 3-morpholinone and 21.7 grams of H$_g$O yielded 35.2 grams of white solid mercuric amide. This product was tested against flies at 300 p.p.m. loadings in accordance with the procedure of Example 2. The flies fed the poisoned bait laid eggs, but none were observed to hatch.

EXAMPLE 12

Bis(p-aminobenzenesulfonamide)-mercury was obtained in 76% yield by heating an aqueous solution of mercuric 2-pyrrolidone with p-aminobenzene-sulfonamide. Flies were fed a bait containing a 300 p.p.m. level of this material as in Example 2. The flies so treated failed to lay any viable eggs.

EXAMPLE 13

The process of Example 2 was followed using 29.7 grams of 5-methyl-2-pyrrolidone and 21.7 grams of H$_g$O to obtain 33.9 grams of the corresponding mercuric amide. Flies were fed a fly bait prepared as in Example 2 containing 300 p.p.m. of the compound, and all treated flies failed to lay viable eggs.

EXAMPLE 14

By the process of Example 2, 60 grams of caprolactam and 21.7 grams of HgO in 100 cc. of water were reacted to give 9.5 grams of mercuric caprolactam. A 300 p.p.m. fly bait prepared as in Example 2 was made up from this substance and fed to flies. The treated flies laid eggs, but none of the eggs hatched.

EXAMPLE 15

In order to compare the effectiveness of the organo-mercuric substance utilized in the present invention against flies with that of somewhat related compounds and conventional insecticides, flies were fed baits prepared in accordance with Example 2 containing 300 p.p.m. of each mercuric chloride, phenyl mercuric acetate and pyrrolidone. In all of these three cases the flies treated apparently were unharmed and laid eggs which were viable and hatched. The number of eggs laid in each case is set out below in Table 2. For comparative purposes, results obtained at loadings of 300 p.p.m. of the indicated organo-mercuric substances of the invention are also shown.

Table 2

| Chemical compound: | No. of eggs |
|---|---|
| Mercuric pyrrolidone | 50–100 |
| Mercuric chloride.N-methylpyrrolidone complex | 0 |
| Mercuric chloride.pyrrolidone complex | 0 |
| Mercuric benzamide | 0 |
| Mercuric acetamide | 50–100 |
| Mercuric morpholinone | 50–100 |
| Bis(p-aminobenzenesulfonamide)-mercury | 50–100 |
| Mercuric caprolactam | 50–100 |
| Mercuric chloride | 50–100 |
| Phenyl mercuric acetate | 5,000–10,000 |
| Pyrrolidone | 5,000–10,000 |

EXAMPLE 16

The foliage of bean plants was dipped in a 0.25% aqueous solution of mercuric pyrrolidone. After the leaves were dried, Mexican bean beetles were allowed to feed on them. The beetles fed freely but laid few eggs. The eggs that were laid did not hatch when stored under normal conditions.

EXAMPLE 17

The reaction product of 17.4 grams of 2-oxazolidone and 21.7 grams of mercuric oxide was prepared as in Example 2. 25.8 grams of white crystalline solid melting at 285° C. with decomposition was obtained. Mexican bean beetles fed on leaves dipped in a 0.25% solution of this compound laid few eggs and none were viable.

EXAMPLE 18

In order to demonstrate the effectiveness of the organo-mercuric substances employed in the invention as bactericides, mercuric pyrrolidone was tested against the gram-negative bacteria *Salmonella typhosa*. The test method was the "use dilution" modification of the official AOAC αhenol Coefficient Test. Under the test conditions, and at a compound concentration corresponding to 5 p.p.m. mercury, mercuric pyrrolidone inhibited the growth of *Salmonella typhosa* at a contact time of less than 5 minutes. On the other hand, under the same conditions it was determined that neither sodium dichlorocyanurate (5 p.p.m. available Cl) nor phenyl mercuric acetate (5 p.p.m. Hg) inhibited the growth of *Salmonella typhosa* at contact times ranging up to 15 minutes.

What is claimed is:

1. A method of controlling pests selected from the group consisting of insects, bacteria, and fungi which comprises contacting said pests with an effective amount of an organo-mercuric substance selected from the group consisting of (a) the organo-mercuric compounds of the formula

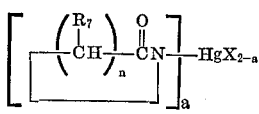

and (b) the organo-mercuric complexes of the formula

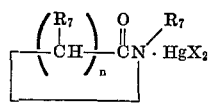

wherein $n$ is an integer selected from the group consisting of 3, 4 and 5; $R_7$ is lower alkyl; $a$ is an integer selected from 1 and 2; and X is an anion.

2. The method according to claim 1 wherein said pests are insects.

3. The method according to claim 2 wherein said organo-mercuric substance is mercuric pyrrolidone.

4. The method according to claim 2 wherein said anion is chloride.

5. The method according to claim 4 wherein said organo-mercuric substance is N-chloro mercuri-2-pyrrolidone.

6. The method according to claim 4 wherein said organo-mercuric substance is N-chloromercuri-N-methyl-2-pyrrolidone.

7. The method according to claim 1 wherein said pests are bacteria.

8. The method according to claim 7 wherein said organo-mercuric substance is mercuric pyrrolidone.

9. The method according to claim 7 wherein said anion is chloride.

10. The method according to claim 9 wherein said organo-mercuric substance is N-chloro mercuri-2-pyrrolidone.

11. The method according to claim 9 wherein said organo-mercuric substance is N-chloromercuri-N-methyl-2-pyrrolidone.

12. The method according to claim 1 wherein said pests are fungi.

13. The method according to claim 12 wherein said organo-mercuric substance is mercuric pyrrolidone.

14. The method according to claim 12 wherein said anion is chloride.

15. The method according to claim 14 wherein said organo-mercuric substance is N-chloro mercuri-2-pyrrolidone.

16. The method according to claim 14 wherein said organo-mercuric substance is N-chloromercuri-N-methyl-2-pyrrolidone.

17. A method for controlling insects which comprises feeding insects with a composition comprising an edible carrier and an effective amount of an organo-mercuric substance selected from the group consisting of (a) the organo-mercuric compounds of the formula

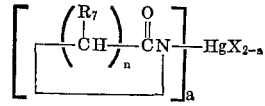

and (b) the organo-mercuric complexes of the formula

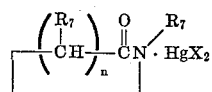

wherein $n$ is an integer selected from the group consisting of 3, 4 and 5; $R_7$ is lower alkyl; $a$ is an integer selected from 1 and 2; and X is an anion.

18. The method according to claim 17 wherein said organo-mercuric substance is present in an amount in the range of from about 0.01 to about 0.2% by weight of said composition.

19. The method according to claim 17 wherein said organo-mercuric substance is mercuric pyrrolidone.

20. The method according to claim 17 wherein said anion is chloride.

21. The method according to claim 20 wherein said organo-mercuric substance is N-chloro mercuri-2-pyrrolidone.

22. The method according to claim 20 wherein said organo-mercuric substance is N-chloromercuri-N-methyl-2-pyrrolidone.

23. An insect bait composition comprising an edible carrier and, in an amount in the range of from about 0.01 to about 0.2% by weight of said composition, of an organo-mercuric substance selected from the group consisting of (a) the organo-mercuric compounds of the formula

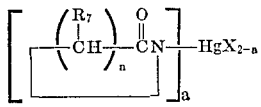

and (b) the organo-mercuric complexes of the formula

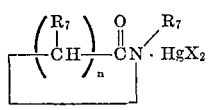

wherein $n$ is an integer selected from the group consisting of 3, 4 and 5; $R_7$ is lower alkyl; $a$ is an integer selected from 1 and 2, and X is an anion.

24. The insect bait composition according to claim 23 wherein said organo-mercuric substance is mercuric pyrrolidone.

25. The insect bait composition according to claim 23 wherein said anion is chloride.

26. The insect bait composition according to claim 25 wherein said organo-mercuric substance is N-chloro mercuri-2-pyrrolidone.

27. The insect bait composition according to claim 25 wherein said organo-mercuric substance is N-chloromercuri-N-methyl-2-pyrrolidone.

References Cited

UNITED STATES PATENTS 3,376,330   4/1968   Thomann et al. _____ 167—22

ALBERT T. MEYERS, *Primary Examiner.*

J. D. GOLDBERG, *Assistant Examiner.*